E. E. GRAY.
MACHINE FOR FORMING PACKAGES.
APPLICATION FILED JUNE 5, 1916. RENEWED JAN. 19, 1921.
1,386,105. Patented Aug. 2, 1921.
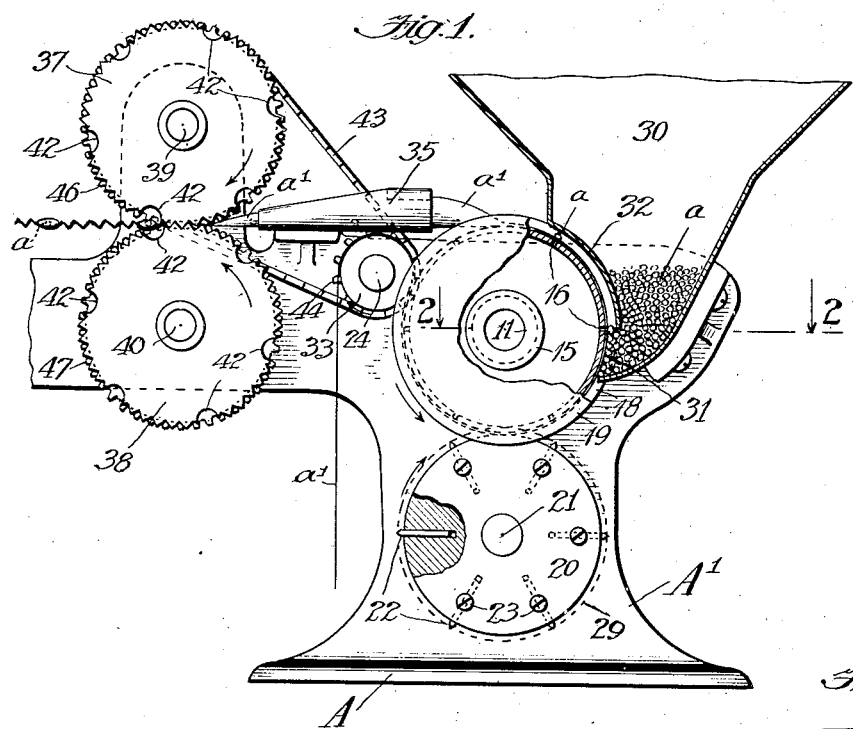
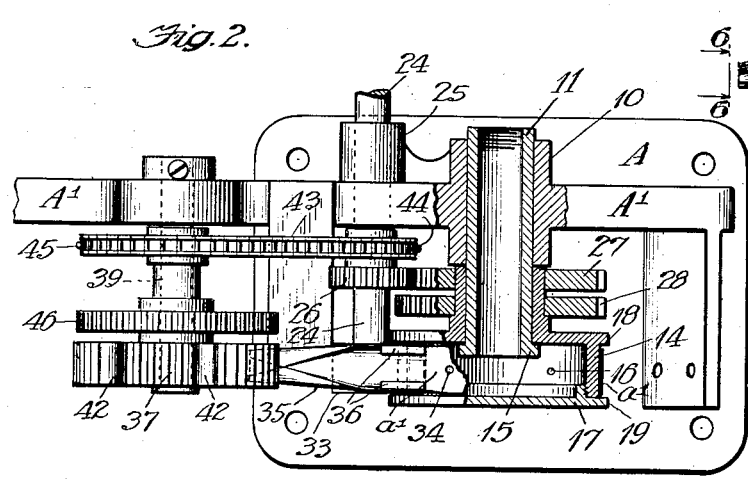
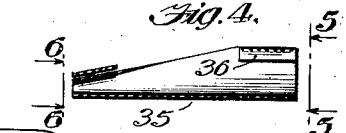
Witnesses
Martin H. Olsen.
Edna A. Olaison.
Inventor
Edward E. Gray.
By Jno. E. Waldo
Atty.

UNITED STATES PATENT OFFICE.

EDWARD E. GRAY, OF PLANO, ILLINOIS, ASSIGNOR, BY MESNE ASSIGNMENTS, TO IVERS-LEE COMPANY, OF NEWARK, NEW JERSEY, A CORPORATION OF DELAWARE.

MACHINE FOR FORMING PACKAGES.

1,386,105.  Specification of Letters Patent.  Patented Aug. 2, 1921.

Application filed June 5, 1916, Serial No. 101,804. Renewed January 19, 1921. Serial No. 438,531.

*To all whom it may concern:*

Be it known that I, EDWARD E. GRAY, a citizen of the United States, and resident of Plano, in the county of Kendall and State of Illinois, have invented a new and useful Machine for Forming Packages, of which the following is a specification.

This invention relates to machines for forming packages such as seed-tape and the like, the following description of one embodiment of said invention being directed more particularly to the features of a machine adapted to produce a convenient form of package for seeds although it is contemplated that the invention may well be applied to the making of packages containing articles other than seeds.

For convenience in planting, to avoid the waste of seeds due to planting an excessive number of seeds, as is almost universally the case where seeds are dropped by hand, and to eliminate the work incident to thinning out or removing superfluous plants after they have attained some size so that they will not crowd and impair the growth and development of each other, seeds of various kinds are, at the present time, incased in a continuous envelop of suitable light paper, or the like, said paper being of such texture that it will readily disintegrate when subjected to moisture, as the moisture of the soil in which the seeds are planted, thus permitting the seeds to germinate and grow in the usual way.

One object of the present invention is to provide improved and simplified means, in a machine of this general type, for securing the tape material in folded position so as to retain the seeds or other articles within the envelop formed thereby, without the use of glue. To effect this object, a machine of my invention may comprise the various features, combinations of features and details of construction hereinafter described and claimed.

In the accompanying drawings, in which one embodiment of my invention is fully illustrated, Figure 1 is a side view, partly in section, of a seed packaging machine embodying my invention, parts thereof forming no part of the present invention being omitted.

Fig. 2 is a top plan view of the portion of the machine shown in Fig. 1, parts thereof being shown in section on the line 2—2 of Fig. 1; and Fig. 3 is a plan view of the folder, Fig. 4 is a section taken on the line 4—4 of Fig. 3, Fig. 5 is an end view of the folder shown by the lines 5—5 on Fig. 4 and Fig. 6 is a view taken at the other end of the folder on the lines 6—6 on Fig. 4.

While the present invention is applicable to general use in connection with any machine for forming packages, such as seed tape, or the like, in which the lateral edges of the tape material fold over the seeds or other articles to inclose the same. However, for purposes of concrete illustration, I have, in the drawings, shown the same as applied for use in connection with a machine of the general type and for the same general purpose as that which forms the subject matter of an application for United States Letters Patent heretofore filed by me in the Patent Office on the 31st day of May A. D. 1916, having Serial Number 101,002 excepting that the tape material, instead of being twisted, as in said application, Serial No. 101,002, is merely folded over the seeds, substantially as shown in application for United States Letters Patent heretofore filed by me on the 27th day of May, A. D. 1916, Serial No. 100,228, and the drawing in the present case includes a means for crimping the folded paper which incloses the seed.

The frame of my improved machine comprises a supporting base A and an upright web A' thereon upon which the operative parts of the machine are mounted.

Formed on the web A' is a boss 10 secured in a hole formed through which is a tube 11, the outer of which is adapted to be connected to suitable means, as an air pump, not shown. Rotatably mounted on a suitable bearing on said tube 11 is a hollow suction head or picker member 14, said suction head being retained in position on said tube 11 by a flange 15 on said tube. The suction head is provided with peripheral holes 16 of relatively small bore. To render the hollow interior of the suction head 14 accessible if for any reason desired, the outer side 17 thereof is made removable, convenient means for this purpose comprising a threaded flange on said removable head which is adapted to engage an interior screw thread formed at the open side of said suction head. Marginal flanges 18 and 19 on said suction head define a circumferential groove therein. Coöperating with said suction head, is a cylindrical perforator 20, which is rotatably mounted on a stud 21 secured in the web A' of the machine frame in such position that its perimeter will extend into the circumferential groove in the suction head and into close proximity to the bottom of said groove through which the holes or apertures 16 are formed. Said perforator is driven at the same peripheral speed as the circumference of the suction head 14, and projecting from the surface of said perforator are needle punches 22 which are preferably adapted to be adjusted radially, being shown as secured in position by means of set screws 23. These punches correspond in number and peripheral spacing with the holes or apertures 16 and are adapted to successively enter said apertures as said suction head and punch device rotate. Rotation is imparted to the suction head 14 and to the perforator 21 from a shaft 24 rotatably mounted in a bearing boss 25 on the frame member A' and which is driven from any suitable source of power, not shown. Trains of gears, which comprise gears 26 and 27 secured to rotate with the driving shaft 24 and the hub of the suction head 14, respectively, and gears 28 and 29 secured to rotate with said suction head 14 and with the perforator 21, respectively, are employed to transmit the driving power from shaft 24 to the suction head and punch device.

Mounted on the machine frame is a hopper 30 in which the seeds, on which the machine is designed to operate, indicated at a, are contained, said hopper or receptacle being so positioned with reference to the suction head 14 that said suction head will enter an opening 31 formed laterally in the lower end of said hopper and which forms in effect a closure therefor which will prevent the seeds from running out of said hopper by gravity. A gate 32, which may either be fixed or adjustable, extends downwardly within the hopper adjacent to the opening 31 formed therein, which will operate to define a desired depth of seeds within said hopper resting in contact with said suction head and will also prevent the seeds from escaping the opening 31 in said hopper at the upper side of said suction head.

In the operation of the machine, a strip of tape material, preferably thin, light paper, or the like, indicated at a', is drawn, in the form of a continuous web or strip, from a suitable source of supply, not shown, and passes thence around a guide roll 33 desirably made of soft rubber, or the like, and which, as shown, is secured to the driving shaft 24 and runs in contact with the periphery of the suction head. From said guide roll, the tape material passes around the under side of the suction head 14 between said suction head and the perforator 21, the punches 22 on said perforator coöperating with the holes or apertures 16 in the suction head to form perforations 34 in said tape material before it passes over the segment of said suction head with which the seeds in the seed hopper contact. With the described construction and method of operation, it is obvious that suction within the suction head 14 will operate to cause seeds which come into contact with said tape material to adhere thereto so long as said tape material is exposed to suction from within said suction head.

From said suction head, the tape material passes to the folding device, which, as shown, comprises a trough shaped plate 35, the bottom of which extends substantially horizontal and tangent to the upper side of the suction head 14. At the end nearest said suction head, said trough shaped plate 35 is relatively wide and is provided with internal overhanging guide lugs 36, which are adapted to receive the edges of the tape material as it comes from said suction head and which will operate as a guide therefor. A short distance beyond said lugs 36, said trough shaped plate 35 begins to taper and to assume a funnel shape, the end of said plate 35 remote from said suction head 14 being of such small size and so shaped that it will cause the marginal edges of the tape material to overlap and inclose the seeds and will impart to said tape material a flattened, tubular shape in cross section.

From said folding device, the tape material folded into flattened, tubular form, as stated, passes between what may be described as crimping rolls 37 and 38, consisting of disks rotatably mounted on studs 39 and 40 secured in the upright web portion A' of the machine frame and formed in the perimeters of which are transverse serrations or grooves which intermesh with each other as said crimping rolls rotate and which will operate to crimp or corrugate the folded tape material with the seeds inclosed therein as it passes between said rolls. To prevent said crimping rolls 37 and 38 from crushing the seeds inclosed in said tape material as they pass between said crimping rolls, said crimping rolls are provided at intervals with recesses 42, which are spaced peripherally the same as the seeds contained in said folded tape material, said crimping rolls being so adjusted that the recesses 42 in said wheels, respectively, will register with each other as said rolls rotate and also with the seeds inclosed within the tape material, thus forming openings between said wheels adapted to receive the seeds inclosed in the tape material and preventing crushing of the same, in the manner desired.

The crimping rolls 37 and 38 may be mounted so as to be rotated idly by the tape as it is drawn between said rolls, but will preferably be positively driven by means of suitable driving connection with the driving shaft 24 as by a chain belt 43 adjusted to sprocket wheels 44 and 45 secured to the driving shaft 24 and to a hub on the crimping roll 37, respectively, and gears 46 and 47 secured to rotate with the hubs of said crimping rolls 37 and 38, respectively. The crimping rolls 37 and 38 are so geared to the driving shaft 24 that the folded tape material is crimped in an efficient manner, and that there is no tendency to break the tape by reason of the crimping rolls tending to pull the tape material through the machine.

Said crimping rolls will operate, in an obvious manner, to impart a permanent crimp to the seed tape or package as it passes between the same, which will operate to secure the folds of the tape material in folded position and the seeds or articles therein in spaced relation in the manner desired.

From the crimping rolls 37 and 38, the finished seed tape or package passes to the winding device or reel by means of which it is wound into rolls or coils, which, as fast as they are formed, are removed from said winding device or reel and packed in boxes or cartons for sale and use.

The improvements which constitute my present invention have no reference or relation to the winding device or reel, which may be of any usual or desired construction and of which several forms adapted for use on the present machine are old and well-known. For this reason, the winding device or reel is not shown in the drawings, but reference is here made to application for United States Letters Patent heretofore filed by me in the Patent Office on the 27th day of May, A. D. 1916, Serial No. 100,228, in which a winding device or reel which may be readily adapted for use on the machine which forms the subject-matter of the present application is fully shown and described.

From the foregoing description of the apparatus, it is believed that the operation of my improved machine will be readily understood from the drawings and specification without a separate description thereof in detail.

Seed tape, such as the illustrated embodiment of my improved machine is designed for making, forms the subject-matter of a separate application for United States Letters Patent filed by me in the Patent Office on the 10th day of June 1916, and having Serial Number 102,698, to which reference is made for a description thereof.

I claim:—

1. In a machine for forming packages, the combination of means for supporting a supply of package forming material, means for depositing articles thereon, means for folding said material, and means for crimping said folded material to secure the same in folded position.

2. In a machine for forming packages, the combination of means for supporting a supply of package forming material, means for depositing articles thereon, means for folding said material, and means for crimping said folded material to secure the same in folded position and the articles in spaced relation therein.

3. In a machine for forming packages, the combination of means for supporting a supply of package forming material, means for depositing articles thereon, means for folding said material, and means for crimping said folded material to secure the same in folded position, said means comprising serrated rolls between which said folded material passes.

4. In a machine for forming packages, the combination of means for supporting a supply of package forming material, means for depositing articles thereon, means for folding said material, and means for crimping said folded material to secure the same in folded position, said means comprising serrated rolls between which said folded material passes together with the articles carried thereby, said crimping rolls being provided with peripheral notches adapted to register with and receive the articles contained in said material.

5. In a machine for forming packages, the combination of means for supporting a supply of package forming material, means for depositing articles thereon, means for folding said material, and means for crimping said folded material to secure the same in folded position, said means comprising driven serrated rolls between which said folded material passes.

6. In a machine for forming packages, the combination of means for supporting a supply of package forming material provided with perforations, means for bringing articles in contact therewith, means for subjecting said material to suction whereby articles coming in contact therewith will be caused to adhere to the perforations therein, means for folding said material, and means for crimping said folded material to secure the same in folded position.

7. In a machine for forming packages, the combination of means for supporting a supply of package forming material provided with perforations, means for bringing articles in contact therewith, means for subjecting said material to suction whereby articles coming in contact therewith will be caused to adhere to the perforations therein, means for folding said material, and means for crimping said folded material to secure the same in folded position and the articles in spaced relation therein.

8. In a machine for forming packages, the combination of means for supporting a supply of package forming material provided with perforations, means for bringing articles in contact therewith, means for subjecting said material to suction whereby articles coming in contact therewith will be caused to adhere to the perforations therein, means for folding said material, and means for crimping said folded material to secure the same in folded position, said means comprising serrated rolls between which said folded material passes.

9. In a machine for forming packages, the combination of means for supporting a supply of package forming material provided with perforations, means for bringing articles in contact therewith, means for subjecting said material to suction whereby articles coming in contact therewith will be caused to adhere to the perforations therein, means for folding said material, and means for crimping said folded material to secure the same in folded position, said means comprising serrated rolls between which said folded material passes together with the articles carried thereby, said crimping rolls being provided with peripheral notches adapted to register with and receive the articles contained in said material.

10. In a machine for forming packages, the combination of a support for a supply of package forming material, means for depositing articles thereon, and means for crimping said material to secure the same in position, said means comprising rolls provided with means for preventing crushing of the articles.

11. In a machine for forming packages, the combination of a support for a supply of package forming material provided with perforations, means for bringing articles in contact therewith, means for subjecting said material to suction whereby articles coming in contact therewith will be caused to adhere to the perforations therein, and means for crimping said folded material to secure the same in folded position.

12. In a machine for forming packages, the combination of a support for a supply of package forming material provided with perforations, means for bringing articles in contact therewith, means for folding said material, and means for crimping said folded material to secure the same in folded position and the articles in spaced relation therein.

13. In a machine for forming packages, the combination of a support for a supply of package forming material, means for depositing articles thereon, and means for crimping said material to secure the same in position, said means comprising rolls between which said material passes together with the articles carried thereby, said crimping rolls being provided with means adapted to register with and receive the articles to prevent crushing of the articles.

14. In a machine for forming packages, the combination of a support for a supply of package forming material, means for depositing articles thereon, and means for crimping said tape to secure the same in position, said means comprising serrated rolls between which said material passes together with the articles carried thereby, said crimping rolls being provided with peripheral notches adapted to register with and receive the articles contained in said material.

15. In a machine for forming packages, the combination of a support for a supply of package forming material provided with perforations, means for bringing articles in contact therewith, means for folding said material, and means for crimping said folded material to secure the same in folded position.

In testimony, that I claim the foregoing as my invention, I affix my signature in the presence of two subscribing witnesses this 29th day of May, A. D. 1916.

EDWARD E. GRAY.

Witnesses:
 ANNA C. MEEGAN,
 HOWARD AMES.